Patented Dec. 16, 1947

2,432,532

UNITED STATES PATENT OFFICE 2,432,532

PRODUCTION OF ACETONITRILE

John E. Mahan, Bartlesville, Okla., assignor to Phillips Petroleum Company, a corporation of Delaware No Drawing. Application April 20, 1945, Serial No. 589,457

8 Claims. (Cl. 260—464)

This invention relates to a process for the preparation of acetonitrile. In one of its more specific aspects, it relates to a process for the preparation of acetonitrile by the interaction of ammonia with aliphatic olefins of three to five carbon atoms per molecule.

Heretofore the application of acetonitrile in the field of industrial chemistry has been retarded due to the lack of an economical synthesis of this potentially valuable material. In addition to the classical applications of acetonitrile as an organic intermediate, its use in vitamin synthesis has been reported. Furthermore, because of its stability under a wide range of conditions, the application of acetonitrile as a specialty solvent merely awaits an efficient and economical method of synthesis. Conventional laboratory methods of preparing acetonitrile, such as the dehydration of acetamide or the interaction of ethyl halides and alkali metal cyanides have been of negligible practical value industrially. The most promising synthesis has been the reaction of acetylene and ammonia at temperatures of about 750° F. in the presence of contact catalysts. But, while considerable attention has been accorded to this reaction, it suffers from several disadvantages. In general reaction conditions in the acetylene-ammonia systems are favorable to the formation of pyridine derivatives. In order to suppress such side reactions, excessively long contact times have been required. A further disadvantage of the acetylene system is the practical necessity of working at low pressures to avoid explosive decomposition of the acetylene.

An object of this invention is to provide a process for the production of acetonitrile.

Another object is to provide a process for the production of acetonitrile by the interaction of ammonia with an aliphatic olefin.

Still another object is to provide a process wherein a three to five carbon atoms aliphatic olefin is reacted with ammonia in the presence of selective contact catalysts such that acetonitrile is the principal reaction product.

Other objects and advantages will be apparent to those skilled in the art from the following detailed description and specific examples of the operation of the process of this invention.

I have now found that acetonitrile can be efficiently and economically produced from the interaction of olefins of from three to five carbon atoms per molecule and ammonia over a contact catalyst comprising natural or synthetic alumina. I have found that the simple mono-olefins of three, four, and five carbon atoms may be utilized in my process. Propylene, $C_3H_6$, is a particularly valuable hydrocarbon for this reaction with ammonia to yield acetonitrile. Butene-1 and isobutylene have also been found to be particularly valuable for use as feed to the process of my invention. In general, lower yields are obtained from the higher molecular weight olefins. Although some acetonitrile is produced with olefins of more than five carbon atoms the yield is generally not sufficient to be practical at present.

In accordance with my invention, a hydrocarbon feed stock comprising a three to five carbon atom aliphatic olefin, is admixed with ammonia and the reaction carried out in the vapor phase at an elevated temperature in the presence of an alumina catalyst. Propylene, butenes, and pentenes are suitable aliphatic olefins for use in this process. The olefins may be present in admixture with other hydrocarbons or inert gases; preferably the olefins are present in the feed stock in a concentration of at least 80 per cent by volume. The ammonia is preferably present in molar excess, based upon the content of the desired olefin in the feed stock. Either natural or synthetic alumina may be used in the catalyst. Pellets of synthetic alumina are very satisfactory as catalyst. The reaction may be carried out at a temperature of from 900 to 1400° F. Pressures may range from subatmospheric to about 250 pounds per square inch gauge or higher. Unlike the acetylene-ammonia reaction mixture, the olefin-ammonia reaction mixture of the present process is not explosive at moderate elevated pressure. The reaction effluent may be cooled sufficiently to condense normally liquid constituents, the uncondensed ammonia separated therefrom, and the liquid fraction distilled to yield an acetonitrile fraction having a boiling range of about 176 to 180° F.

When employing propylene as feed in this reaction, I have found that a mol ratio of about three mols of ammonia to one of olefin is a desirable ratio to use, although molar excesses of ammonia varying from very slightly above 1:1 to as high as 5:1 have given satisfactory results with this olefin. When other olefins are used, ratios of about three mols of ammonia to one of olefin are satisfactory, but in general higher rather than lower ratios of ammonia to olefin will be employed when using the generally less reactive $C_4$ and $C_5$ olefins.

Although under certain conditions of operation acetonitrile may be satisfactorily produced at temperatures at or above 1400° F., I prefer to operate my process at temperatures not above 1200° F. Above this level undesirable decomposition into ammonium cyanide and other products is more difficult to so control that satisfactory yields are obtained. Similarly, while in some cases it may be desirable to operate my process as low as 900° F., I prefer to carry out the reaction at 1100° F. or above in order to realize the generally greater conversions per pass obtainable. I have found the range 1100 to 1200° F. to be the preferred operating range when using any of the olefin feeds contemplated in this invention.

The present process does not suffer from pressure limitations as is the case in processes using acetylene. The reaction has been found to proceed satisfactorily at atmospheric pressure. Moderate superatmospheric pressures are usually of great advantage in actual operation of a commercial plant, and in my process I have found that they may be used with impunity, up to about 250 pounds per square inch gauge. At higher pressures undesirable polymerizations of olefins, etc., become prominent. Preferably, a pressure within the range of about atmospheric to about 100 pounds per square inch gauge is employed.

Various forms of aluminum oxide of natural or synthetic origin may be used as catalysts. Among the naturally occurring materials I prefer to use bauxite. A synthetic activated alumina prepared as one product of the fusion of cryolite, $AlF_3 \cdot 3NaF$ with alkali, has for instance been found to yield very active catalyst preparations.

Example 1

A vaporized mixture of propylene and ammonia blended in a mol ratio of 1:3 was preheated to about 800° F. and charged to a steel catalyst case filled with 130 ml. of a granular synthetic activated alumina. The reactor temperature was maintained between 1150 and 1200° F. at atmospheric pressure and at a feed flow rate of 0.48 gaseous liter per minute. The catalyst case effluent was passed through an efficient condenser held at 32° F. The excess ammonia was vented and the liquid condensate was fractionally distilled to yield a fraction of acetonitrile amounting to 32 mol per cent based on the propylene charged.

Example 2

A vaporized mixture of propylene and ammonia blended in a mol ratio of 1:2 was preheated to about 800° F. and charged to a steel catalyst case filled with 130 ml. of a granular natural bauxite. The reactor temperature was maintained at 1150° F., at a pressure of 75 pounds per square inch gauge and with a feed flow rate of 0.56 gaseous liter per minute. The catalyst case effluent was passed through a pressure reducing valve, and the liquid product condensed and fractionated as in Example 1. A yield of acetonitrile amounting to 23 mol per cent of the propylene charged was obtained.

Example 3

A vaporized mixture of butene-1 and ammonia in a mol ratio of 1:3 was passed through the apparatus of Example 1 employing 130 ml. of the same synthetic alumina catalyst maintained at 1200° F. at a feed flow rate of 0.50 gaseous liter per minute, at atmospheric pressure. On treatment of the effluent from the reaction chamber in a manner similar to the above mentioned example, a yield of acetonitrile equivalent to 25 per cent of the butene-1 charged was obtained.

Example 4

A gaseous mixture of isobutene and ammonia in a mol ratio of 1:3 was passed through the apparatus of Example 1 employing the same synthetic alumina catalyst. The reactor temperature was maintained at 1200° F. with a feed flow rate of 0.40 gaseous liter per minute to the 130 ml. of catalyst. The effluent was separated as described in Example 1. The yield of acetonitrile obtained was 21 mol per cent based on the isobutene in the feed.

I claim:

1. A process for the production of acetonitrile which comprises reacting a three to five carbon atom aliphatic monoolefin with ammonia in vapor phase in the presence of alumina as the catalyst at a temperature within the range of from 1100 to 1200° F. and at a pressure within the range of from about atmospheric to about 100 pounds per square inch gauge.

2. A process as defined in claim 1 wherein said monoolefin is propylene.

3. A process as defined in claim 1 wherein said monoolefin is butene-1.

4. A process as defined in claim 1 wherein said monoolefin is isobutene.

5. A process for the preparation of acetonitrile which comprises admixing a three to five carbon atom aliphatic monoolefin with a molar excess of ammonia and passing the resulting mixture in vapor phase at a temperature within the range of from about 900° F. to about 1400° F. and at a pressure less than about 250 pounds per square inch gage into contact with an alumina catalyst.

6. A process for the production of acetonitrile which comprises admixing a three to five carbon atom aliphatic monoolefin with ammonia in relative proportions of from about one to five mols of ammonia per mol of olefin and passing the resulting mixture in vapor phase at a temperature within the range of from about 1100° F. to about 1200° F. and at a pressure within the range of from about atmospheric to about 100 pounds per square inch gage into contact with alumina as the catalyst.

7. A process for the production of acetonitrile which comprises admixing propylene with ammonia in the relative proportions of about three mols of ammonia per mol of propylene and passing the resulting mixture at a temperature within the range of from about 1100° F. to about 1200° F. and at a pressure within the range of from about atmospheric to about 100 pounds per square inch gage into contact with alumina as the catalyst.

8. A process as defined in claim 6 wherein the catalyst is bauxite.

JOHN E. MAHAN.

REFERENCES CITED

The following references are of record in the file of this patent:

UNITED STATES PATENTS

| Number | Name | Date |
| --- | --- | --- |
| 2,381,470 | Teter | Aug. 7, 1945 |
| 2,381,471 | Teter | Aug. 7, 1945 |
| 2,381,472 | Teter | Aug. 7, 1945 |
| 2,381,473 | Teter | Aug. 7, 1945 |
| 2,381,709 | Apgor et al. | Aug. 7, 1945 |
| 1,920,795 | Jaeger | Aug. 1, 1933 |
| 1,934,838 | Andrussow | Nov. 14, 1933 |
| 1,957,749 | Andrussow et al. | May 8, 1934 |